United States Patent [19]
Fields

[11] 3,919,954
[45] Nov. 18, 1975

[54] APPARATUS AND METHOD FOR HANDLING AND PROCESSING GREEN WOOD VENEER IN THE MANUFACTURE OF PLYWOOD

[75] Inventor: Fred W. Fields, Portland, Oreg.

[73] Assignee: The Coe Manufacturing Company, Painesville, Ohio

[22] Filed: July 5, 1974

[21] Appl. No.: 485,826

Related U.S. Application Data

[63] Continuation of Ser. No. 238,157, March 27, 1972, abandoned, which is a continuation-in-part of Ser. No. 118,850, Feb. 25, 1971, abandoned.

[52] U.S. Cl. ............ 112/121.29; 156/93; 156/559
[51] Int. Cl.$^2$ ...................... D05B 33/00; B32B 7/08
[58] Field of Search ............ 156/304, 93, 255, 264, 156/499, 510, 516, 517, 559; 161/50; 112/2 R, 121.29

[56] References Cited
UNITED STATES PATENTS

| | | | |
|---|---|---|---|
| 1,805,179 | 5/1931 | Loetscher | 156/304 |
| 2,691,995 | 10/1954 | Carlson | 156/304 |
| 3,003,541 | 10/1961 | Prentice et al. | 156/304 |
| 3,242,025 | 3/1966 | Copp | 156/304 |
| 3,579,405 | 5/1971 | Crawford | 156/304 |
| 3,616,065 | 10/1971 | Larson | 156/304 |
| 3,705,829 | 12/1972 | Brenneman et al. | 156/304 |
| T896,014 | 3/1972 | Huffaker | 156/304 |

Primary Examiner—Douglas J. Drummond
Attorney, Agent, or Firm—Watts, Hoffmann, Fisher & Heinke Co.

[57] ABSTRACT

An apparatus and method for making plywood panel core sheets from pieces of green veneer characterized by the procedure of: (1) crowding the pieces of green veneer into close side-by-side relationship on a moving conveyer; (2) stitching or sewing with thread the crowded pieces of green veneer to form a continuous green veneer web; (3) clipping or cutting the continuous web into sheets larger than the plywood panels being manufactured in order to allow for shrinkage when the green veneer sheets are subsequently processed through a dryer; and (4) processing the oversize sheets of green veneer through a veneer dryer. In a preferred embodiment of the invention, green fractional and green fishtail veneers are delivered from a veneer clipper to a conveyer for subsequent processing. The green veneer fishtail veneers are separated from the other fractional veneers and are cut into pieces of usable size before being crowded together and stitched or sewn into the continuous web which is cut into green core sheets. The fractional veneers which are separated from the fishtail veneers are similarly crowded together along another processing line and are stitched or sewn into a continuous web which is clipped into green core sheets. The core sheets from both processing lines are stacked and later processed through a veneer dryer.

2 Claims, 1 Drawing Figure

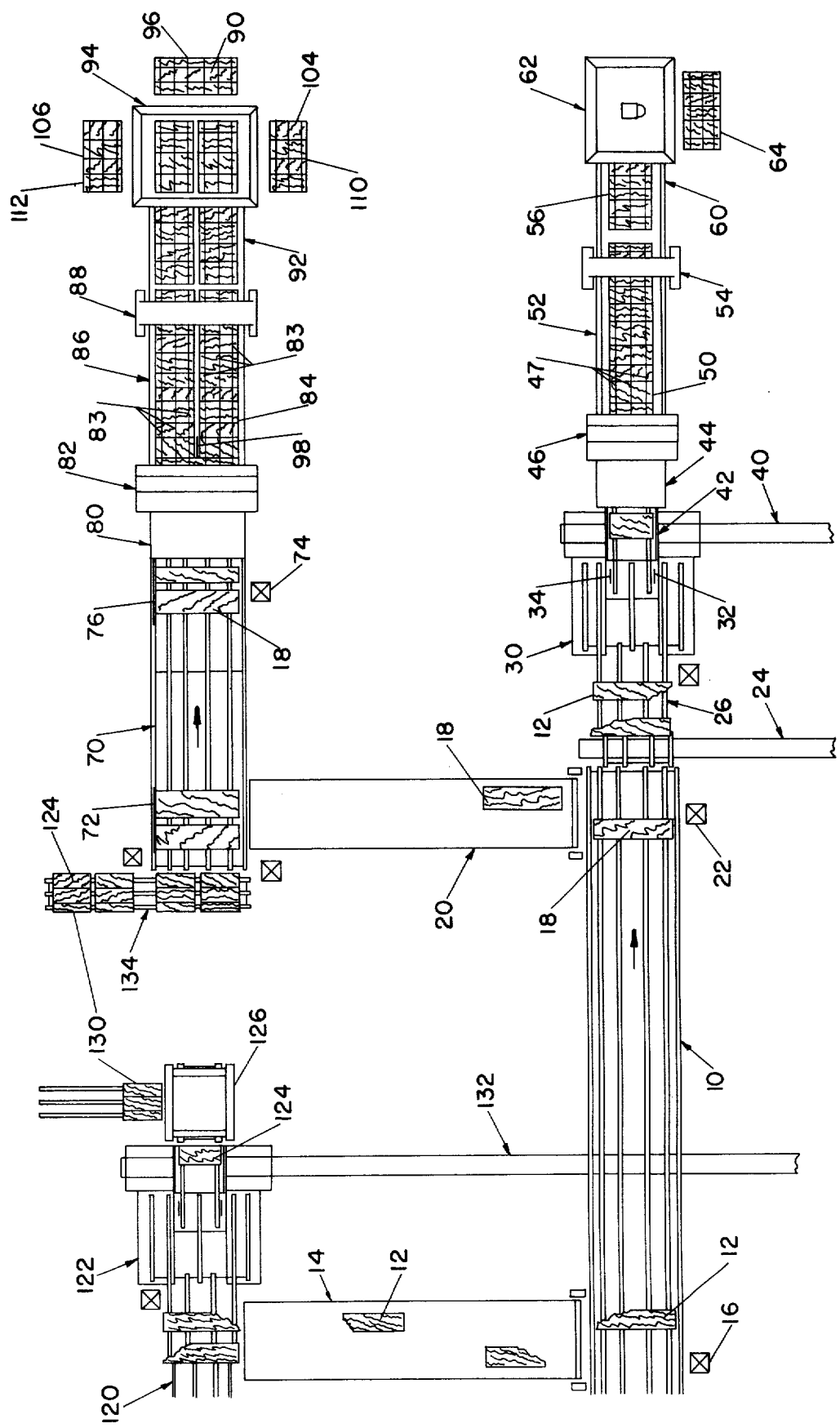

APPARATUS AND METHOD FOR HANDLING AND PROCESSING GREEN WOOD VENEER IN THE MANUFACTURE OF PLYWOOD

Cross-Reference to Related Applications

This application is a continuation of co-pending application Ser. No. 238,157, entitled "Apparatus for and Method of Handling and Processing Wood Veneer in the Manufacture of Plywood", filed Mar. 27, 1972 and now abandoned. Application Ser. No. 238,157 is a continuation-in-part of application Ser. No. 118,850, entitled "Veneer Article and Process of Manufacturing Plywood", filed Feb. 25, 1971 and now abandoned. The disclosures of both applications are incorporated herein by reference.

Background of the Invention

The present invention relates generally to the manufacture of plywood panels, and more specifically to methods and apparatus for making plywood panel core sheets from pieces of green veneer.

Wood veneer used in the manufacture of plywood originates in the form of relatively long strips which are typically peeled by a veneer lathe from a "green" log. These strips of green veneer have a moisture content which may range from about 30% to 300% of the fiber weight or from about 25% to 75% of the total weight. As the veneer is peeled from the green log, the strips or ribbons of veneer thus produced are caught on belted storage decks or run-out tables from which they are transferred to a single deck conveyer and subsequently clipped transversely of their lengths into green sheets or "veneers" having dimensions slightly greater than the width and length of the finish plywood panels. Plywood panels are typically 8 feet long and 4 feet wide. The veneers are typically 8 feet long plus 7 inches and 4 feet wide plus about 4 inches. The thickness of the veneers is usually about 1/24 inch to ¼ inch. The veneers having dimensions in the ranges indicated are hereinafter referred to as "pre-panel" size veneers.

Defective areas in the veneer ribbons are removed by the clipping operation, and this results in many small pieces of green veneer which are less than pre-panel size. For example, 50% or more of the pieces cut from the veneer strips are usually less than pre-panel size. These green veneers of less than pre-panel size are hereinafter referred to as "fractional" and "fishtail" veneers. Fishtail veneers are fractional veneers which are not of uniform width throughout their length, but which have a full width part equal to at least half their length. These fishtail veneers may be cut into salvage material and scrap.

It has been the practice to dry the pre-panel size veneers and the fractional veneers in a veneer dryer and then to manufacture the panel using the full size veneers as the "back" and "face" layers and the fractional pieces as center, core and crossband materials intermediate the back and face layers. Since the plywood panels have at least the three layers of veneers and since the layers intermediate the backs and faces are seldom, if ever, full size veneers, it is apparent that the drying of veneers and their assembly into a plywood panel necessitates repeated handling of many narrow or short veneer pieces. The handling of the veneers, including arranging them in close side-by-side relation when "laying up" the panels, is time consuming and results in considerable breakage and other damage to the veneers. The loading of the fractional veneers into dryers also has required considerable manual handling of the veneer pieces.

Efforts have been made in the past to unitize the fractional veneers prior to assembling the plywood panels in order to alleviate the handling problems and to reduce breakage. A typical example of the prior art practice is disclosed in Defensive Publication No. T896,014, published Mar. 7, 1972. According to that publication, the fractional veneers are brought into edge-to-edge contact and are united by tapes adhesively bonded to the surfaces of the veneer sections. The resulting multisection thin veneer core sheet is then cut into pieces of the desired size. Another proposal for unitizing pieces of veneer is disclosed in U.S. Pat. No. 1,805,179. The procedure disclosed in this patent involved an attempt to stitch or sew dry veneer pieces together to form a strip which then could be cut into lengths of the desired size.

Summary of the Invention

An object of the present invention is to provide new and improved methods and apparatus for making plywood panel core sheets from unitized pieces of green veneer.

Another object of the present invention is to provide new and improved methods and apparatus for processing pieces of green veneer characterized in that the pieces of green veneer are sewn together with thread and made into plywood panel core sheets for better handling during further operations, such as drying, grading, laying-up plywood panels, etc.

A more specific object of the present invention is to provide methods and apparatus for making plywood panel core sheets by a new and improved procedure involving stitching with thread fractional green veneers to form continuous green veneer webs, clipping or cutting the webs into sheets of pre-panel size, and processing the sheets of green veneer through a veneer dryer.

According to the provisions of the present invention, fractional green veneers normally used as center, core and cross-band material in the plywood panels being manufactured are arranged in close side-by-side relation and are united together to form a single green veneer sheet or web. The green fractional veneers are united by stitching them together with fiber cord or thread material. Green fishtail veneers are separately processed by trimming to form usable salvage material. These salvage pieces are also stitched together to form a single green veneer sheet or web. The green veneer webs are clipped or cut into pre-panel size sheets and are then processed through a veneer dryer.

The procedure of unitizing the pieces of green veneer makes it possible to mechanize and reduce the cost of various plant operations such as veneer drying, dry grading, and the process of laying-up the plywood panels.

Additional objects and advantages and a fuller understanding of the invention will be had from the following detailed description of a preferred embodiment of the invention and the accompanying drawing.

Brief Description of the Drawing

The drawing is a fragmentary plan view of a plywood mill showing one embodiment of the invention.

Description of the Preferred Embodiment

Referring to the apparatus illustrated in the drawing, reference character 10 designates the downstream portion of a conveyer, typically referred to as the "green chain", from which the full pre-panel size green veneers have been removed. Some of the green fishtails 12 on the conveyer 10 may be manually transferred to a transverse conveyer 14 by an operator at a station designated 16 and the remainder allowed to continue along the green chain with the fractional size green veneers 18, as desired.

Adjacent the downstream end of the green chain 10, the green fractionals 18 are transferred to a transverse conveyer 20 by an operator stationed at or adjacent the operator's position 22. The scrap veneer on the green chain is either allowed to fall into a transverse scrap veneer conveyer 24 at the end of the green chain or is transferred thereto by an operator at or adjacent the operator's station 22. The green fishtails 12 continue along a conveyer 26 in a second veneer processing conveyer line to a fishtail saw table 30 where the fishtails are sawed into usable lengths by fishtail saws 32, 34 which are normally positioned approximately 4 feet plus 2 to 4 inches from one another. The scrap veneer is allowed to fall off the fishtail saw table into a transverse scrap conveyer 40 and the usable green veneers continue along another conveyer 42 to a "crowder" 44 where they are moved into edge-to-edge position. The crowder 44 feeds the green veneers to a "stitcher" 46 where they are stitched, as by stitching 47, into a continuous green veneer sheet or ribbon 50, the width of which is slightly over 4 feet. The continuous green veneer sheet or ribbon 50 continues toward the right, as viewed in the drawing, on a conveyer 52 to the clipper 54 where it is cut into green veneer sheets 56 the lengths of which are slightly greater than 4 feet, for example, 4 feet 6 inches, to produce what is referenced to in the art as 8 X 4 inches sheets. The green veneer pre-panel size 8 X 4 inches sheets thus produced are carried by a conveyer 60 to a vacuum stacker 62 which preferably stacks them into a stack 64 at one side of the conveyer, which in the embodiment shown is the near side. The stacks 64 thus produced can be transferred by suitable equipment to the dryer for further processing.

The fractional green veneers 18 are carried by the conveyer 20 to a conveyer 70 of a third veneer processing conveyer line which in the embodiment shown is parallel to the second veneer processing conveyer line. A back stop 72 at the side of the conveyer 70 opposite from the conveyer 20 assists in aligning the fractional green veneers on the conveyer 70. As the green veneers 18 are carried along the conveyer 70, their ends are further aligned by an operator at or adjacent the operator's position, designated 74, by being pushed against a second back stop 76 at the side of the conveyer opposite from the operator.

The conveyer 70 carries the aligned green fractional veneers 18 onto a crowder 80 which crowds the green fractional veneers, that is, moves them into side-by-side position and feeds them to a stitcher 82. The stitcher 82 stitches them, as by stitches 83, in a continuous green veneer sheet or ribbon 84 and discharges it onto a conveyer 86 which carries it to a clipper 88 where the green veneer continuous sheet 84 is cut into green veneer sheets 90 having a length slightly greater than 4 feet to produce so-called 4 X 8 sheets. Such green veneer sheets of pre-panel size are then carried on a conveyer 92 to a vacuum stacker 94 which stacks them into a stack 96 at the end of the conveyer 92. If desired, a saw 98 can be positioned midway between the sides of the conveyer 86 between the stitcher 82 and the clipper 88 and the green veneer continuous sheet 86 cut into two green veneer continuous sheets, each slightly more than 4 foot wide. In this event the 4 foot plus wide continuous sheets of stitched green veneers are clipped by the clipper 88 at intervals slightly greater than 8 feet to produce 8 X 4 sheets 104, 106. In this event two green veneer sheets of pre-panel size arrive simultaneously at the stacker 94 and the stacker 94 is then operated to deposit the sheets 104, 106 at opposite sides thereof into stacks 110,112, respectively.

Whether or not green fishtails 12 are diverted from the green chain 10 to the transverse conveyer 14 will normally depend upon whether or not the fishtails on the green chain 10 at any given time exceeds the capacity of the apparatus downstream from the conveyer 20 to handle them. If the capacity of this equipment is exceeded, the excess or if for other reasons green fishtails are diverted to the transverse conveyer 14 they are fed thereby to a conveyer 120 parallel with the conveyer 10. The conveyer 120 carries the green fishtails 12 thereon to a fishtail saw table 122 similar to the fishtail saw table 30 where they are cut into usable green pieces 124 and fed to a vacuum stacker 126 where they are formed into a suitable stack 130. The scrap veneer is carried away from the fishtail saw by a scrap conveyer 132. The stack 130 can be subsequently transferred to the infeed end of conveyer 70 as by a conveyer 134 extending transversely of the infeed end of the conveyer 70. When the conveyer 70 is not being employed to process green fractional veneers 18, the green salvage material 124 can be fed thereto in double side-by-side rows and subsequently stitched into two green continuous sheets slightly more than 4 feet wide, which in turn are cut into green 8 X 4 sheets and stacked by the vacuum stacker 94 into stacks similar to the stacks 110,112, previously referred to.

The equipment herein illustrated and described may be considered as two transversely spaced parallel conveyer or veneer processing lines connected by a transverse conveyer through or along which the green fractional veneers move continuously and are continuously processed.

Suitable individually equipment units, such as the various conveyers, fishtail saw tables, crowders, stitchers, vacuum stackers, etc., are available and are not shown in and described in detail. As previously mentioned, the green fractional veneers are relatively thin, being typically of a thickness of about 1/24 inch to ¼ inch, and are soft and plyable because of their high water content. These green veneers can be readily stitched by available sewing or stitching machines modified for this purpose. Typical stitches are approximately ½ inch long, although stitches of other lengths may be employed. A plurality of rows of stitches are preferred and are normally produced simultaneously. To this end, the stitcher units each have a plurality of stitching heads, preferably 6, arranged transversely of the path traveled by the veneers being stitched, which heads may be of chain-stitch or the lock-stitch type utilizing pre-punched holes for the stitching needles, as desired. Such a head is shown in United States Pat. No. 2,217,967 to Phillips. The novelty of the present invention is in the particular arrangement of the various equipment units shown and described.

While the preferred embodiment of the invention has been described in some detail, certain changes may be made in the arrangement layout shown without departing from the invention as will be understood by those skilled in the art to which the invention belongs, for example, the location of a continuous dryer between either of the stitchers shown and the clipper downstream therefrom.

What is claimed is:

1. An apparatus for unitizing pieces of green veneer and making core sheets for plywood panels comprising in combination: first conveyer means for moving a plurality of green fractional and fishtail veneers in a direction transversely of their lengths along a first production path from which the green fractional veneers are removed at a predetermined location; a fishtail saw along first conveyer means downstream from said first predetermined location for producing usable pieces of green veneer from green fishtails carried by said first conveyer means; a first crowder mechanism along said first conveyer means for arranging the pieces of green veneer in close side-by-side relation; a first stitcher mechanism downstream from said first crowder mechanism for stitching with thread the pieces of green veneer into a green veneer ribbon; a first clipper mechanism downstream from said first stitcher mechanism for cutting the green ribbon transversely of its length into sheets of a size larger than the plywood panels being manufactured in order to allow for shrinkage when the green veneer sheets are subsequently processed through a dryer; a second conveyer means for receiving the green fractional veneers removed from said first conveyer means and moving the green fractional veneers along a path of travel; a second crowder mechanism along said second conveyer means for arranging the green fractional veneers in close side-by-side relation; a second stitcher mechanism downstream from said second crowder mechanism for stitching with thread the green fractional veneers into a second green veneer ribbon; a second clipper mechanism downstream from said second stitcher mechanism for cutting the second green veneer ribbon into green sheets of a size larger than the plywood panels being manufactured in order to allow for shrinkage when the green veneer sheets are subsequently processed through a dryer; and a veneer dryer arranged to receive the green veneer sheets from said first and second clipper mechanisms.

2. An apparatus for unitizing pieces of green veneer and making core sheets for plywood panels comprising in combination: first conveyer means for moving a plurality of green fractional and fishtail veneers in a direction transversely of their lengths along a path from which the green fractional veneers are removed at a predetermined location; a fishtail saw along said first conveyer means downstream from said predetermined location for producing usable pieces of green veneer from the green fishtails carried by said first conveyer means; a crowder mechanism along said first conveyer means downstream from said fishtail saw for arranging the usable pieces of green veneer carried by said first conveyer means in close side-by-side relation; a first stitching mechanism having a plurality of stitching or sewing heads arranged transversely of said first conveyer means and located downstream from said crowder mechanism for stitching with thread the pieces of green veneer into a first green veneer ribbon; a first clipper mechanism along said first conveyer means downstream from said first stitching mechanism for cutting said first green veneer ribbon transversely of its length into pre-panel size 8 × 4 sheets; a first automatic stacker downstream from said first clipper mechanism for stacking the pre-panel size 8 × 4 sheets; second conveyer means for moving a plurality of green fractional veneers removed from said first conveyer means in a direction transversely of their lengths along a second path; a second crowder mechanism along said second conveyer means for arranging the green fractional veneers in close side-by-side relation; a second stitching mechanism having a plurality of stitching or sewing heads arranged transversely of said second conveying means and located downstream from said second crowder mechanism for stitching with thread the green fractional veneers into a second green veneer ribbon; a second clipper mechanism downstream from said second stitching mechanism for cutting the second green veneer ribbon transversely of its length into pre-panel size 4 × 8 sheets; a second automatic stacker downstream from said second clipper mechanism for stacking the 4 × 8 sheets; and veneer dryer means downstream from said first and second automatic stackers for receiving the 8 × 4 and the 4 × 8 sheets.

* * * * *

UNITED STATES PATENT AND TRADEMARK OFFICE
CERTIFICATE OF CORRECTION

PATENT NO. : 3,919,954
DATED : November 18, 1975
INVENTOR(S) : Fred W. Fields

It is certified that error appears in the above-identified patent and that said Letters Patent are hereby corrected as shown below:

Col. 3, line 39, change "8 x 4 inches" to "8 x 4"--;

Col. 3, line 40, cancel "inches".

Signed and Sealed this twenty-fourth Day of February 1976

[SEAL]

Attest:

RUTH C. MASON
Attesting Officer

C. MARSHALL DANN
Commissioner of Patents and Trademarks